United States Patent
Sartori et al.

(10) Patent No.: US 8,018,893 B2
(45) Date of Patent: Sep. 13, 2011

(54) METHOD AND APPARATUS FOR RELAY FACILITATED COMMUNICATIONS

(75) Inventors: Philippe J. Sartori, Algonquin, IL (US); Kevin L. Baum, Rolling Meadows, IL (US); Brian K. Classon, Palatine, IL (US); Mark C. Cudak, Rolling Meadows, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1322 days.

(21) Appl. No.: 11/119,852

(22) Filed: May 2, 2005

(65) Prior Publication Data

US 2005/0232183 A1 Oct. 20, 2005

Related U.S. Application Data

(63) Continuation-in-part of application No. 10/654,227, filed on Sep. 3, 2003, now Pat. No. 7,400,856.

(60) Provisional application No. 60/602,506, filed on Aug. 18, 2004.

(51) Int. Cl.
*H04W 4/00* (2009.01)

(52) U.S. Cl. ........ 370/329; 370/315; 370/328; 370/330; 370/338; 370/341; 455/7; 455/9; 455/11.1; 455/13.1; 455/450; 455/451; 455/452.1; 455/452.2; 455/509

(58) Field of Classification Search .................. 370/344, 370/319, 310.1, 315, 328, 329, 330, 338, 370/431, 312, 316, 322, 341; 455/7, 8, 9, 455/10, 11.1, 13.1, 16, 450, 451, 452.1, 452.2, 455/552.1, 553.1, 504, 509; 375/211, 212, 375/214
See application file for complete search history.

(56) References Cited

U.S. PATENT DOCUMENTS

| 5,408,679 A | * | 4/1995 | Masuda | 455/11.1 |
| 5,548,803 A | * | 8/1996 | Evans | 455/16 |
| 5,633,876 A | | 5/1997 | Dinkins | |

(Continued)

FOREIGN PATENT DOCUMENTS

WO 03039026 5/2003

OTHER PUBLICATIONS

LAN/MAN Standards Committee and the IEEE Microwave theory and techniques Society, IEEE 802.16 IEEE standard for local and metropolitan area networks, Part 16: Air Interface for Fixed Broadband Wireless Access Systems, Apr. 8, 2002.*

(Continued)

*Primary Examiner* — Olumide T Ajibade Akonai

(57) ABSTRACT

Communications sourced by a remote unit (14) that is already within reception range of a base site (10) can nevertheless be further facilitated through allocation of one or more relay resources (15, 16). Such relay resources, properly employed, then serve to effectively increase the quality of service for the facilitated communication. This, in turn, can permit the use of, for example, increased data rates for communications from a relatively low power remote unit.

10 Claims, 11 Drawing Sheets

U.S. PATENT DOCUMENTS

| | | | |
|---|---|---|---|
| 5,684,801 A * | 11/1997 | Amitay et al. | 370/447 |
| 5,874,903 A * | 2/1999 | Shuey et al. | 340/870.02 |
| 5,892,758 A | 4/1999 | Argyroudis | |
| 6,005,884 A | 12/1999 | Cook et al. | |
| 6,132,306 A * | 10/2000 | Trompower | 455/11.1 |
| 6,353,728 B1 | 3/2002 | Fischer et al. | |
| 6,373,833 B1 * | 4/2002 | Suonvieri et al. | 370/347 |
| 6,404,775 B1 * | 6/2002 | Leslie et al. | 370/466 |
| 6,459,725 B1 | 10/2002 | Baker et al. | |
| 6,501,955 B1 | 12/2002 | Durrant et al. | |
| 6,690,657 B1 * | 2/2004 | Lau et al. | 370/315 |
| 6,957,042 B2 * | 10/2005 | Williams | 455/7 |
| 7,139,527 B2 * | 11/2006 | Tamaki et al. | 455/16 |
| 7,218,891 B2 * | 5/2007 | Periyalwar et al. | 455/13.1 |
| 7,933,549 B2 * | 4/2011 | Larsson | 455/7 |
| 2001/0014586 A1 | 8/2001 | Nakatsugawa | |
| 2001/0031621 A1 | 10/2001 | Schmutz | |
| 2002/0028655 A1 * | 3/2002 | Rosener et al. | 455/16 |
| 2003/0220075 A1 * | 11/2003 | Baker et al. | 455/17 |
| 2004/0063451 A1 * | 4/2004 | Bonta et al. | 455/519 |
| 2004/0071128 A1 * | 4/2004 | Jang et al. | 370/349 |
| 2004/0109428 A1 * | 6/2004 | Krishnamurthy | 370/338 |
| 2004/0192204 A1 | 9/2004 | Periyalwar et al. | |

OTHER PUBLICATIONS

Zaruba, G. et al.: "Bluetrees—Scatternet Formation to Enable Bluetooth-Based Ad Hoc Networks", Proc. ICC 2001, vol. 1, pp. 273-277.

Gupta et al.: "The Capacity of Wireless Networks", IEEE Transactions on Information Theory, vol. 46, No. 2, Mar. 2000, pp. 388-404.

Kepler, James F.: "Delay Spread measurements on a Wideband MIMO Channel at 3.7 GHz", © 2002 IEEE, pp. 2498-2502.

Wang et al.: "A First Step Toward Distributed Scheduling Policies in Cellular Ad Hoc Networks", © 2002 IEEE, pp. 8-12.

* cited by examiner

1200

METHOD AND APPARATUS FOR RELAY FACILITATED COMMUNICATIONS

CROSS-REFERENCE TO RELATED APPLICATIONS

This invention relates to patent application Ser. Nos. 10/654,227 and 60/602,506, both of which are incorporated by reference herein.

TECHNICAL FIELD

This invention relates generally to wireless communications and more particularly to the use of communication relays.

BACKGROUND

Wireless communication systems are known in the art. In many such systems remote communication units (at least some of which may be mobile) communicate with one another and/or with others via system infrastructure such as fixed-location transmitters and receivers. In general, wireless communication systems are characterized by a corresponding communication range (typically characterized by either or both of a transmission range and a reception range) beyond which the wireless communications capability of the system infrastructure cannot usefully extend.

Repeaters are also known in the art. Such devices typically serve to extend the communication range of a given communication system (by extending the transmission and/or reception range). Via this mechanism, for example, a relatively low power remote communication unit can effectively communicate with a relatively distant system receiver notwithstanding that the remote communication unit is otherwise out-of-range of the distant system receiver. Such repeaters often operate in an autonomous automatic mode and repeat whatever transmissions they successfully receive.

Unfortunately, despite various improvements to both systems and remote communication units, there remain times and circumstances when the transmissions of a communication unit that is within the communication range of a given communication system are nevertheless not received reliably at a given desired level of quality of service. Various causes exist for this result, including but not limited to shadow fading and other propagation issues. Performance requirements can also pose an impact. For example, as data transmission rates demands continue to increase (leading frequently to a corresponding increase in bandwidth), the ability of an otherwise in-range remote communication unit to successfully effect a desired level of service without a concurrent significant increase in transmission power usually becomes impaired.

BRIEF DESCRIPTION OF THE DRAWINGS

The above needs are at least partially met through provision of the method and apparatus for relay facilitated communications described in the following detailed description, particularly when studied in conjunction with the drawings, wherein.

Figure 1:
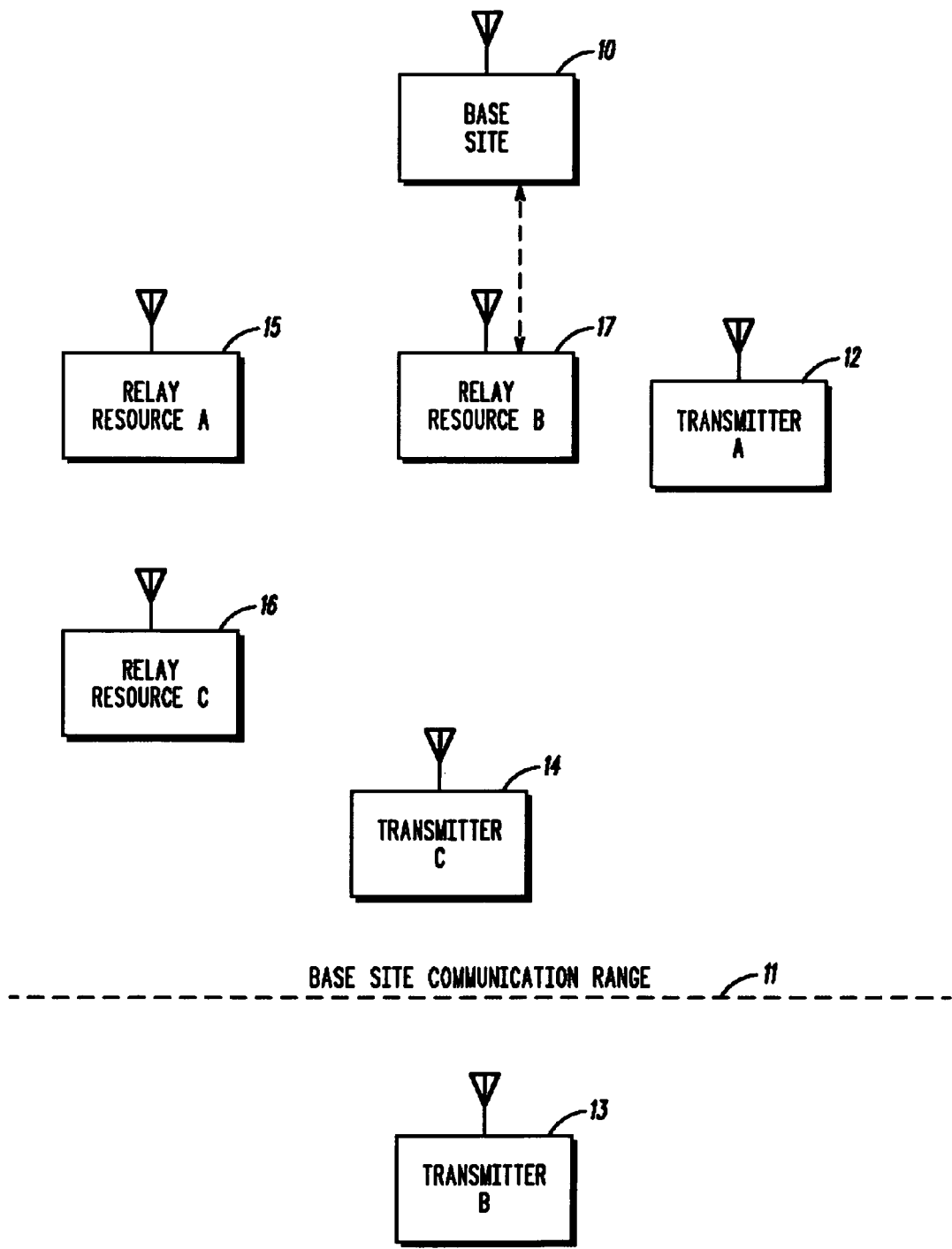
FIG. 1 comprises a diagrammatic system overview as configured in accordance with various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a base site determines a need to receive a wireless transmission from a transmitter that is presently within communications range of the base site and automatically determines whether to allocate a wireless relay resource to thereby at least attempt to increase a quality of service to support the wireless transmission from this transmitter. So configured, one or more relays can be automatically utilized when and as appropriate to support, for example, the use of relatively high data rates by the transmitter.

Such relays can be configured in any number of ways consistent with this approach. For example, a given relay can simply forward, automatically, all received communications (or at least those communications that are received with a least a predetermined degree of acceptable reception) and the base site can effect its determination by automatically determining whether to accept such automatically relayed transmissions. As another example, a given relay can relay received transmissions only upon receipt of an enabling instruction from the base site. In either of the above examples, the relay can effect a concurrent relayed transmission or can effect a store-and-forward operation by delaying the relayed transmission until a later (typically predetermined) time or opportunity.

Such relays can also be used in conjunction with an ARQ process such as a hybrid ARQ process. For example, a relay can store received transmissions from a given remote communication device and only relay a given transmission (or portion thereof) in response to an ARQ request or error indicator from the base site. As another example, the relay itself can further effect a significant part of the ARQ process by storing multiple transmissions of a given data package or message and then combining those stored results to permit a proper decoding of the data package/message. The latter can then be relayed to the base site.

Finally, relaying devices may receive data to be relayed on a first set of frequencies and relay the data on a second set of frequencies. For example, in a communication system employing Orthogonal Frequency Division Multiplexing (OFDM) a relay unit may receive data to be relayed over a first set of sub-carriers, and relay the data over a second set of sub-carriers, with both the first and the second set of sub-carriers being part of an allocated uplink frequency band. In a similar manner, data received by the relay unit may be received having a first modulation and coding scheme (MCS) and may be relayed using a second, differing MCS. For example, modulation schemes such as 16-QAM, 64-QAM or 256-QAM, BPSK, or QPSK may be utilized by both the receive and the transmit link of a relay unit. Additionally, multiple coding rates may be available for each modulation scheme to provide finer granularity, to enable a closer match between the quality and the transmitted signal characteristics (e.g., R=¼, ½, and ¾ for QPSK; R=½ and R=⅔ for 16-QAM, etc.).

The present invention encompasses a method for a relay device to relay information. The method comprises the steps of receiving the information on a first set of frequencies, the information transmitted using a first modulation and coding scheme. The received information is demodulated and decoded. The information is then relayed on a second set of frequencies, the information relayed using a second modulation and coding scheme.

The present invention additionally encompasses a method for a relay device to relay information within a communication system. The method comprises the steps of receiving a message indicating subscriber stations to monitor, receiving an assignment message indicating a relay-to-base resource, receiving transmissions from the subscriber stations, demodulating and decoding the subscriber stations' transmissions, re-modulating and re-encoding the subscriber stations' transmissions, and relaying the re-modulated and re-encoded transmissions over the relay-to-base resource, wherein the transmissions are relayed in a predetermined order.

The present invention additionally encompasses a method for a base station to receive relayed transmissions from a subscriber station. The method comprises the steps of transmitting a control message comprising a relay identifier and one or more subscriber stations to monitor, transmitting an assignment message indicating a relay-to-base resource, wherein the relay-to-base resource is for relaying a plurality of transmissions from the one or more subscriber stations to monitor, and receiving transmissions on the relay-to-base resource from a relay station with the identifier These embodiments are also sufficiently flexible to permit other useful configurations. For example, a given base site can receive the relayed transmissions of one or more relays and utilize those relayed transmissions in combination with transmissions as are received by the base site from the remote communication unit to attempt to reconstruct an accurate version of the original transmission.

These and other embodiments as set forth herein are relatively simple to implement, cost effective, conservative of system resources, architecturally flexible, reliable, and serve well to permit, for example, the use of significantly increased data transmission rates by remote communication units without a corresponding attendant increase in power usage by the latter.

Referring now to FIG. 1, a wireless communication system will typically have at least one base site 10 transceiver (in this embodiment, for the sake of simplicity and clarity, the base site 10 is presumed to serve essentially all of the relevant infrastructure functions described herein; it will of course be understood by those skilled in the art that such functionality can be distributed and/or otherwise parsed over one or more other architectural elements of a given communication system and that the expression "base site" as used herein shall be understood to refer in general to any and all presently known or hereafter developed corresponding communication system infrastructure elements and components). This base site 10 serves, in part to source transmissions to remote units and to receive transmissions from such units.

As noted earlier, wireless communications are typically bounded by a communications range. In one example, the communication range is considered to be the set of all locations where a remote unit and the base site can establish a communication link with a data rate larger than a minimum predetermined data rate. For example, the minimum predetermined data rate can be the data rate necessary for a voice communication, or in another example the minimum predetermined data rate can be the data rate necessary for basic control signaling (such as access requests and grants). Since such a base site 10 can typically transmit with greater power (and often via use of one or more relatively tall and well-placed antenna platforms) than a typical remote unit, the transmit range of such a base site will usually be greater than the effective receive range 11 of the base site. To illustrate, a given base site 10 may have no difficulty in transmitting information to both proximally located remote units (such as transmitter A 12) and to more distally located remote units (such as transmitter B 13). This same base site 10, however, may not be able to reliably receive transmissions as sourced by the more distally located transmitter B 13, as that transmitter is located beyond the effective reception range 11 of the base site 10. Repeaters can be used to extend this effective reception range 11 as is well understood by those skilled in the art. Such range extension, however, is not an essential point of these embodiments. Instead, these embodiments are directed more towards supporting a desired level of quality of service for a remote unit transmitter that is already within the reception communication range 11 of the base site 10.

These embodiments presume the use of one or more wireless relays. FIG. 1 illustrates three such relays 15, 16, and 17 though more or fewer can be utilized as appropriate. Although these embodiments are preferably for relays that are in fixed locations, it should be understood that such relays can be mobile as well. These relays will typically have at least a wireless receiver capability in order to compatibly receive remote unit transmissions and/or control signaling from the base site 10. When re-modulating and re-encoding relayed data, relay units will additionally comprise modulation and coding circuitry. A relay may also have a wireline receiver capability to receive commands from the base site over a wireline link rather than a wireless link. Depending upon the needs of a given application, these relays can have a wireless and/or a wireline transmission capability to facilitate the provision of relayed transmissions to the base site 10 and/or an exchange of signaling with one or more of the remote units. Such wireless transmission capability can be either in-band or out-of-band with respect to the communication resources that are used by the remote units to facilitate their own transmissions (when out-of-band, this can refer to both the physical carrier itself and/or a point of temporal/subchannel/code differentiation). For an in-band wireless transmission capability for relaying transmissions to the base site 10, the relayed transmissions may use a different channel resource than was used by the remote units for the original transmissions, such as a different time slot, a different subchannel, or a different spreading code. In particular, the channel resource assigned for relaying transmissions to the base site 10 may comprise a set of frequencies in a different timeslot. The set of frequencies may be a set of subcarriers or a subchannel. The subcarriers may each have substantially the same bandwidth, for example, in an OFDM system. A subchannel may be an IEEE 802.16 subchannel, which for example may be a set of non-contiguous subcarriers. For frequency division multiple access (FDMA), the set of frequencies comprises a contiguous frequency region. The contiguous region may be referred to as a subchannel. For Interleaved Frequency Division Multiple Access (IFDMA), as is known in the art, block repetition of the information prior to transmission creates a comb-like set of occupied subcarriers. Therefore, for IFDMA, the set of frequencies may also be a set of subcarriers. The set of frequencies or subcarriers may be called a subchannel.

As will be described below in more detail, pursuant to these embodiments, a transmitter (such as transmitter C 14) that is otherwise within reception range 11 of a given base site 10 can benefit from one or more relay resources that can essentially serve to improve reception of the signal originating from the transmitter via better propagation conditions and/or transmit power and thereby permit a higher quality of service (such as but not limited to higher data transmission rates).

Figure 2:
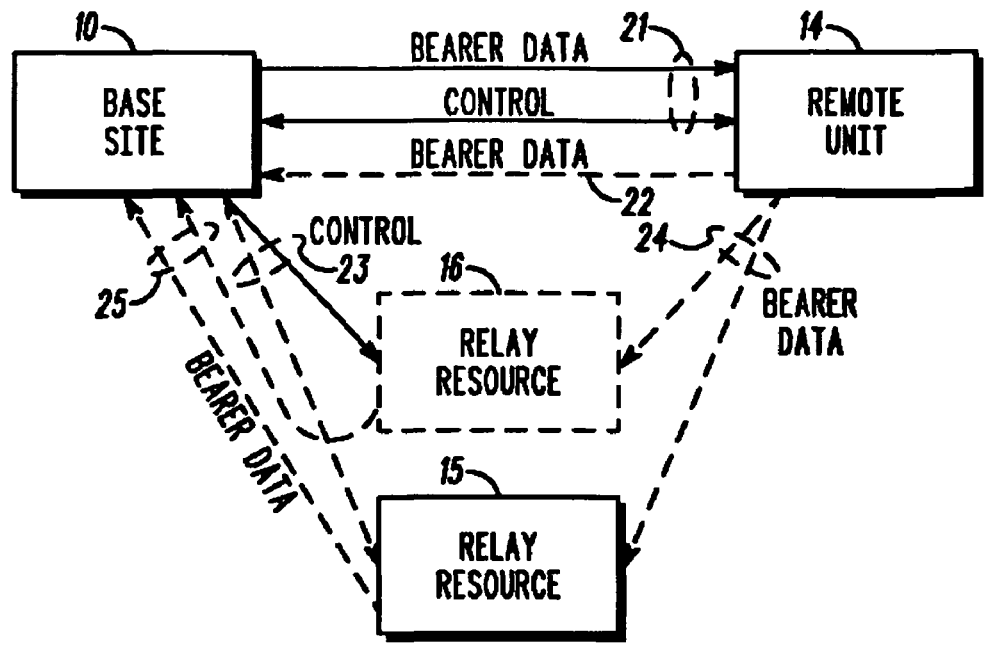
FIG. 2 comprises a block diagram illustrating various communication links as configured in accordance with various embodiments of the invention.

Prior to reviewing these embodiments in greater detail, it may first be helpful to illustrate various approaches to facilitating communications by and between relay resources. With reference to FIG. 2, as suggested above, a base site 10 will often be able to transmit directly to a given remote unit 14. These transmissions 21 can include both control information (such as resource allocation messages and the like specifying times/frequencies/subchannels for transmission/reception as well as what form of modulation and coding to use) and bearer data (such as voice or other user data to be provided to the remote unit 14). In similar fashion, in many instances, the remote unit 14 can itself make direct transmissions 22 to the base site 10 (to provide, for example, ranging and bandwidth request, access requests and/or bearer data). As already noted, however, in some instances, this inbound transmission link may not be of sufficient quality to permit a desired level of quality of service.

Pursuant to these embodiments, the base site 10 can also preferably transmit control information 23 to one or more relay resources (with two such relay resources 15 and 16 being shown in this illustration). Such control information may include the identity of the node to be relayed, specific times/frequencies/subchannels used for transmission/reception as well as what form of modulation and coding to use. Though not essential, such capability will facilitate dynamic flexibility with respect to the particular manner by which a base site 10 elects to utilize a given relay resource to effect provision of a desired level of quality of service for a given remote unit 14. Additionally, control information transmitted to relay devices may be made using the same frequency and time period as the control information being transmitted to remote units, or alternatively, may be broadcast separately from the control information being transmitted to remote units.

The relay resources 15 and 16 are preferably configured to compatibly receive communications, such as bearer data 24, as transmitted by a remote unit 14. Such relay resources can be configured, if desired, to always receive such communications, or to only receive specific communications as assigned, for example, by the base site 10 via corresponding control signaling. In turn, these relay resources 15 and 16 are preferably configured to relay 25 at least portions of the transmissions as received from the remote unit 14. As will be expanded upon below, a given relay resource can be configured in any of a variety of ways in this regard to suit the specific needs and requirements of a given application. For example, a given relay resource can automatically relay (either immediately or at a subsequent time) all received transmissions, or can automatically relay only those received transmissions that at least meet a predetermined (or dynamically established) reception criteria (such as received signal strength or bit error rate), or can only relay all or parts of received transmissions as may be specifically requested by, for example, the base site 10. Other possibilities also exist as will be elaborated upon below.

So configured, a base site 10 can utilize, in a variety of different ways, at least one relay resource to facilitate provision of a desired level of quality of service to support the communications of a remote unit that is already within effective reception range of the base site.

Figure 3:
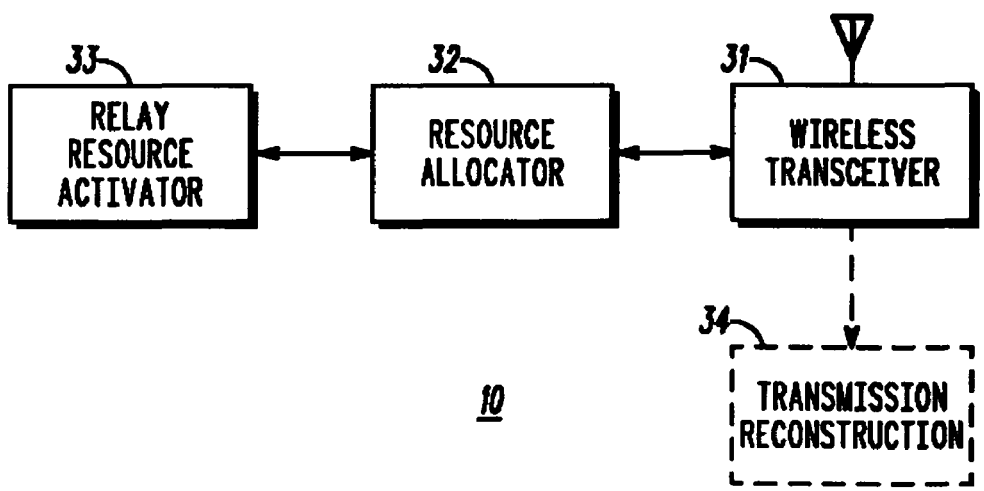
FIG. 3 comprises an illustrative block diagram of a base site as configured in accordance with various embodiments of the invention.

With reference to FIG. 3, a base site 10 will preferably include, in addition to a wireless transceiver 31 and such other communications and control support platforms as may be appropriate to a given application (not shown as such functionality and their supporting platforms are well understood in the art), a resource allocator 32 to determine when to activate a relay resource to support, for example, a requested allocation of resources to facilitate the transmission of information to the base site. Pursuant to one approach, this resource allocator 32 provides such determinations to an optional relay resource activator 33 that aids in controlling how the base site 10 will treat relayed transmissions as received at the base site 10 and/or to facilitate the provision of instructions to a given relay resource. In a preferred approach these instructions will serve to facilitate attainment of the desired quality of service level for the remote unit. As a few illustrative examples, such instructions can include, but is not limited to, any of:

an instruction regarding a particular data transmission rate and modulation and coding scheme to use when relaying a transmission to the base site;

an instruction regarding a particular data transmission rate to use when receiving transmissions from a given remote unit;

an instruction that identifies information regarding a particular channel to monitor to receive transmissions from a given remote unit (including information regarding the frequency of a bearer channel, a time slot (or slots), a spreading code, and the like); and an instruction that identifies information regarding a particular channel to use when relaying a transmission to the base site.

In a preferred embodiment, such a relay resource activator 33 can serve to substantially simultaneously activate a plurality of relay resources to facilitate attainment of a given level of desired quality of service as well as only a single relay resource.

So configured, in addition to such other functionality as may be desired and appropriate to a given application, the base site will include a wireless transmitter and receiver along with a resource allocator that is operably coupled to the wireless transmitter and receiver and that is responsive to a wirelessly transmitted signal from a remote unit that is within reception range of the base site and that is requesting allocation of a communication resource to facilitate transmission of information to the base site. In addition, the base site preferably includes a relay resource activator that is operably coupled to the resource allocator, such that a relay resource can be activated by the communications controller to improve quality of service for a wireless transmission from the remote unit when transmitting within reception range of the base site.

Figure 4:
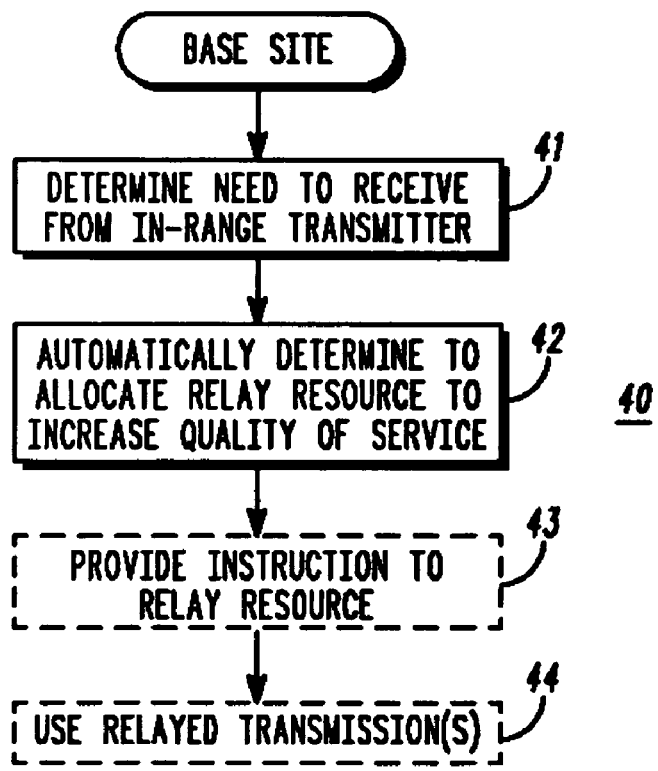
FIG. 4 comprises a base site flow diagram as configured in accordance with various embodiments of the invention.

Referring now to FIG. 4, a base site will typically determine 41 a need to receive a wireless transmission from a transmitter that is presently within communications range of the base site. For example, the base site can receive a wireless message from the transmitter that includes an indication of such a need to transmit (such a request can be communicated, for example, via a control channel).

The process 40 will then automatically determine 42 whether to allocate one or more relay resources to increase the quality of service that would otherwise be provided to support the requested transmission from the transmitter. Such a determination can include determining whether a present wireless communication path between the requesting transmitter and the base site will not likely support a given desired effective data rate. In a preferred embodiment, this determination can including using information regarding link channel quality for at least one transmission from the base site to the transmitter (as one example, the base site could consider the apparent link channel quality as pertained to reception by the base site of a message from the transmitter making requests as suggested above).

Depending upon the needs of a given application, this determination 42 can be limited to determining whether to utilize a single relay resource (either from a solitary available relay resource or from a pool of candidate relay resources as may, or may not, be available in a given system). Or, if desired, this determination 42 can include determining whether to allocate two or more relay resources to support upgraded quality of service for the communication to be facilitated by the base site. In such a case, and again depending upon the needs of a given application, the base site can allocate some but not all presently available relay resources. In a preferred embodiment, when allocating some but not all presently available relay resources, the base site will identify specific relay resources to allocate in this manner. In a simpler embodiments, all the relays can be activated simultaneously.

It is also possible, of course, that the base site could be configured to re-allocate an already-allocated relay resource to support the present communication in preference to an earlier allocation. Such a re-allocation could be based on any of a variety of decision-making criteria including, but not limited to, relative priority levels of the remote units with respect to one another, relative prioritization of the supported communication service, a change in the traffic demand, and/or any other suitable and relevant standard.

As each data transmission is adaptive to the channel conditions, conditions may be such that even if a relay resource can be allocated, it may not be allocated if the direct link to the base site is of sufficient quality. Typically, the determination of whether a relay resource is to be allocated is made for each transmission, but may also be made on a longer term average channel quality basis (e.g., taking shadowing but not fast fading into account).

In many instances, this determination may or can include a determination to allocate a relay resource that itself utilizes at least one carrier resource (such as, for example, a particular wireless link) that is otherwise also shared by the communication system that includes the base site to effect direct communications between the base site and member communication units (for example, the relay resource may utilize such a shared carrier resource to facilitate its own relayed transmissions). In such a case, it may often be appropriate to control such allocation in order to avoid conflicts and/or communication collisions with respect to such a carrier resource. In other instances, this determination may or can include a determination to allocate a relay resource that utilizes at least one carrier resource (such as, but not limited to, a wireline link to the base site) that is not otherwise also shared by the communication system that includes the base site to effect direct communications between the base site and member communication units. In such a case, less care may be needed to ensure that resource-usage conflicts are avoided.

The nature of this determination 42 to allocate a relay resource can vary, at least in part, with respect to the kind of relay resource that is available. For example, in some embodiments, the relay resource may be configured to automatically relay all received transmissions from remote units (or at least those received transmissions that meet at least a predetermined level of signal quality). In such instances, the determination 42 to allocate the relay resource may be effected by the base site determining to accept relayed transmissions as are otherwise automatically sourced by such relay resources.

It is also possible for the nature of the relay resource to vary in other ways as may better accommodate the needs of a given application. For example, the relay resource as allocated by the base site may comprise a relatively simple waveform processing relay resource. As another illustrative example, the relay resource as allocated by the base site may comprise a demodulation processing relay resource or a demodulation and decoding processing relay resource. In the former, the relay transmits a received transmission without first decoding that transmission and while serving in either the digital or analog domain while in the latter the relay decodes the transmission and essentially relays the received transmission in a more substantive way while performing in the digital domain. For example, the relayed data may be re-encoded and re-modulated using a different MCS than received by the remote unit. Both approaches have strengths that potentially better suit the specific needs of a given system or communication requirement. The demodulation process may include the process of equalization and if needed, soft information generation such as log likelihood ratios.

When the relay resource has the ability to decode the received information from the transmitter, another potential alternative embodiment includes providing the relay resource with an ability to assess the accuracy or completeness of the received information and to make follow-on decisions or actions. For example, such a relay resource can therefore be configured to:

demodulate and decode the transmission from the transmitter to provide decoded information;
    determine whether the transmission has been likely correctly received;
    re-encode the decoded information to provide re-encoded information;
    transmit the re-encoded information to the base site when the transmission appears to have been correctly received; and not transmit to the base site any relayed transmissions that would be based upon transmissions that were likely not correctly received.

Additional possibilities related to such capabilities are set forth further below where appropriate.

When making the determination 42 to allocate a relay resource to better support a given quality of service for a given transmitter, yet another possible embodiment includes having the base site decide whether to allocate a relay resource to support a wireless transmission from the base site to the transmitter that is presently within communications range of the base site. Such a determination can reflect and follow upon, for example, a determination that channel conditions for wireless transmissions from the base site to the transmitter are unacceptable due, at least in part, to channel characteristics (including but not limited to channel characteristics such as delay spread characteristics).

In some embodiments, the process 40 can essentially conclude with the allocation determination 42. For example, when the relay resource or resources of the system are configured to automatically relay all (or at least some) received transmissions, this determination set can conclude with the action of choosing to receive and process such automatically relayed transmissions. For other embodiments, however, the process 40 will preferably take additional actions to facilitate implementation of the determination(s) described above.

For example, in many embodiments, it may be desirable for the base site to provide 43 one or more corresponding instructions to the identified relay resource or resources. Such instructions can be provided in a variety of ways as well understood in the art. In a preferred embodiment, such instructions are provided as control signaling via a corresponding control signaling channel. Such an instruction can, for example, cause a receiving target relay resource to relay at least portions of wireless transmissions as received from a given transmitter. In addition, or in the alternative, such instructions can further provide the relay resource with:

- identifying information regarding the transmitter to thereby, for example, facilitate recognition by the relay resource of transmissions from a given transmitter;
- a particular transmission parameter to expect when receiving a transmission from a given transmitter (to either facilitate identification of transmissions from a particular transmitter and/or to facilitate proper reception, demodulation, decoding, or other processing by the relay resource);
- a particular transmission parameter to use when relaying the transmission to, for example, the base site;
- identifying information regarding a particular channel or sub-channels to monitor to receive the transmissions from the transmitter;
- identifying information regarding a particular channel or sub-channels to utilize when relaying the transmission to the base site;
- identifying information regarding a particular MCS utilized by the remote unit;
- identifying information regarding a particular MCS to utilized by the relaying unit; and/or
- a temporal directive that pertains to subsequent relayed transmissions (for example, the base site can instruct the relay resource to utilize a communication time slot of a given carrier when relaying transmissions, which time slot is subsequent to a time slot as was assigned to the transmitter to accommodate the original transmission);

to name a few.

In some embodiments it may be desirable to support a two-way control signaling dialogue between the base site and the relay resource. For example, rather than merely having the base site provide the relay resource with a specific instruction regarding a specific data rate to use when relaying a transmission, it may be appropriate or desirable to have the relay resource negotiate a particular data rate to use when relaying a transmission to the base site. Such a negotiated data rate may, of course, be either greater or lesser than a data rate as may have been unilaterally assigned by the base site sans negotiation and hence may, at least in some settings, provide a more satisfactory level of service.

In a preferred embodiment the base site will then use 44 the relayed transmission or transmissions as provided by the one or more allocated relay resources. The nature of such usage can vary according to the needs of a given application. Transmissions from a plurality (e.g., more than one but possibly only a subset of the total number of relay resources in a sector) of relay resources may be used to receive to receive the transmission from the transmitter. For example, the transmissions from each of the selected relay resources can be made on the same channel resource (in this case the relay resources are preferably synchronized to the base station timing and frequency so that the transmissions from the selected relay resources arrive at the base station approximately synchronously). As stated above, a relay resource may not transmit to the base site any relayed transmissions that would be based upon transmissions that were likely not correctly received; the relay resource will leave the channel resource empty if the relay resource fails to correctly receive/decode the data transmission from the transmitter (remote unit). The plurality of relay resources also preferably use the same MCS. In another example, pursuant to one approach, the base site can utilize the relayed transmissions from a single relay resource in lieu of any other source. Pursuant to another approach, the base site can receive the original transmission from the remote unit and the relayed transmission from the relay resource, compare the two received signals, and exclusively utilize whichever appears to be the better signal. Or the base site can receive the original transmission from the remote unit and the relayed transmission from the relay resource and combine the two signals using any algorithm known in the art (such as the "maximal ratio combining" algorithm). As yet another permutation of such an embodiment, the base site can receive the original transmission from the remote unit along with multiple relayed transmissions as sourced by a corresponding number of relay resources and then again select whichever signal appears to best represent the informational content for exclusive usage or combine a plurality of the received signals.

In some of the embodiments noted above, the base site essentially identifies a best transmission and then uses that transmission to the exclusion of any remaining transmissions that also represent the same substantive content. As an optional embellishment to any of these processes, the base site can request that portions of a transmission be repeated to supplement (or substitute for) an incorrectly received transmission. For example, an automatic repeat request (ARQ) process can be utilized to effect such an approach. (As is well understood in the art, ARQ typically comprises a protocol for error control in data transmissions. Generally speaking, when a receiver detects an error in a packet (using any of a number of well understood error detection techniques), the receiver automatically requests the transmitter to resend the packet. This process can be repeated until the packet is error free or the error continues beyond a predetermined number of transmissions.)

Pursuant to one approach, the base site can transmit an appropriate ARQ message or error indicator to a transmitting remote unit and then again receive the resultant transmission or transmissions as previously described above. Pursuant to another approach, and as may be particularly appropriate when the base site relies upon transmissions from a relay resource, the base site can transmit its ARQ message or error indicator to the appropriate relay resource to thereby prompt the relay resource to repeat the corresponding transmission without also inducing the remote unit to also repeat its earlier transmission Pursuant to a relatively simplistic ARQ scheme, error-laden transmissions may be wholly discarded in favor of subsequently received transmissions. In other cases, however, at least some representation of a given transmission may be retained and then later combined with a subsequent retransmission. The representation of the given transmission may be the digitally sampled waveform, soft samples or log likelihood ratios. This process of combining the representation of a transmission with a subsequent retransmission is commonly known to those skilled in the art as Hybrid ARQ. In an optional embodiment, the base site can retain representations of transmissions from, for example, multiple sources. For example, the base site might receive an original transmission from a remote unit transmitter and a relayed version thereof from two relay resources. While each of the transmissions may have errors, the base site might nevertheless be able to combine two or more of these received transmissions to thereby yield a properly reconstructed transmission without necessitating a specific ARQ message to request a complete or partial re-transmission. In a similar fashion, the base site reconstructs as much of a given transmission as is possible using such transmissions and relayed transmissions and then uses an ARQ process as suggested earlier above to cause a repeated transmission from the remote unit transmitter and/or one or more of the relay resources to thereby attempt to correctly decode the transmission.

In the embodiments just described, the base site combines multiple transmissions to reconstruct a complete properly received message. Pursuant to another embodiment, such reconstruction can also be effected by a relay resource (either to supplement the actions of the base site or in lieu thereof). So configured, originally received and subsequently repeated transmissions can be combined as appropriate to reconstruct a correctly received transmission. Pursuant to one embodiment, the relay resource can relay the representation of the received transmission if it is unable to correctly decode the transmission. Pursuant to another embodiment, the relay resource can eschew relaying any information until a complete correctly reconstructed transmission is available to relay. Pursuant to an another embodiment, the relay may transmit a message to the base-site indicating that the information was likely not successfully decoded, for instance a negative acknowledgement message.

Figure 5:
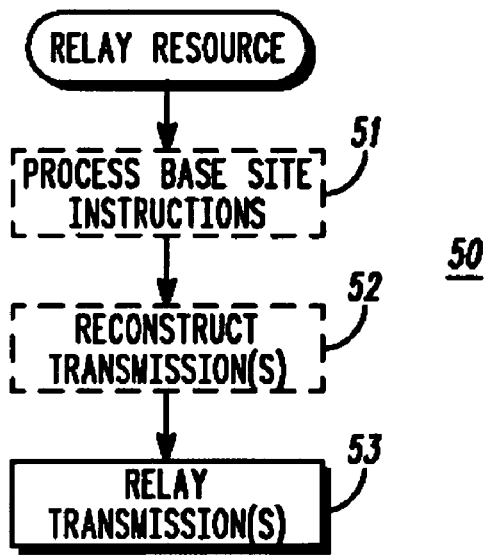
FIG. 5 comprises a relay resource flow diagram as configured in accordance with an embodiment of the invention.

As already noted earlier, a wide variety of relay resource platforms can be employed to serve the needs and requirements of these various embodiments. In some embodiments, and referring now to FIG. 5, a relay resource can optionally process 51 base site instructions (including base site instructions as set forth above and herein). Such a capability is particularly useful when the relay resource does not automatically and relatively constantly serve to simplistically repeat any and all received transmissions and/or in settings where specific details regarding how and when particular transmissions are to be received, demodulated, decoded, combined, and/or relayed are preferably provided from the base site to the relay resource. As also noted above, in some optional embodiments, it may be desirable for the relay resource to reconstruct 52 a transmission from representations of previously received multiple transmissions. In any event, an appropriate relay resource process 50 will eventually include the relaying 53 of part of all of one or more received transmissions.

In general, the base site apparatus and relay resources are sufficiently programmable and/or otherwise flexibly configurable with respect to their design and operation that such actions as those described herein for these various embodiments are readily implementable by those skilled in the art.

To aid in illustrating the flexibility and application of some of these embodiments, a number of illustrative examples will now be provided. It will be understood that these examples are not exhaustive but rather are simply indicative of the various ways in which these various embodiments can be usefully employed.

EXAMPLE 1

Figure 6:
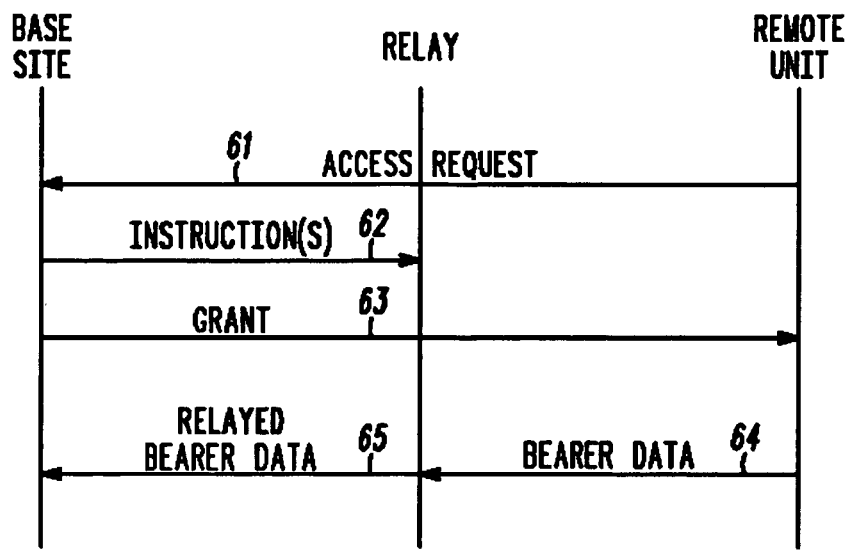
FIG. 6 comprises a timing diagram for a first example as configured in accordance with various embodiments of the invention.

Referring now to FIG. 6, a remote unit that is within reception range of a given base site transmits an access request 61. The base site determines that a relay resource should be allocated to adequately support the quality of service needs of the requested communication and provides corresponding instructions 62 to a selected relay resource. The base site then conveys a grant 63 to the remote unit containing, for example, information identifying the bearer channel and the like. The remote unit then wirelessly transmits its bearer data 64. The relay resource receives this bearer data transmission 64 and concurrently relays 65 this transmission to the base site (using, for example, a wireline pathway to the base site).

EXAMPLE 2

Figure 7:
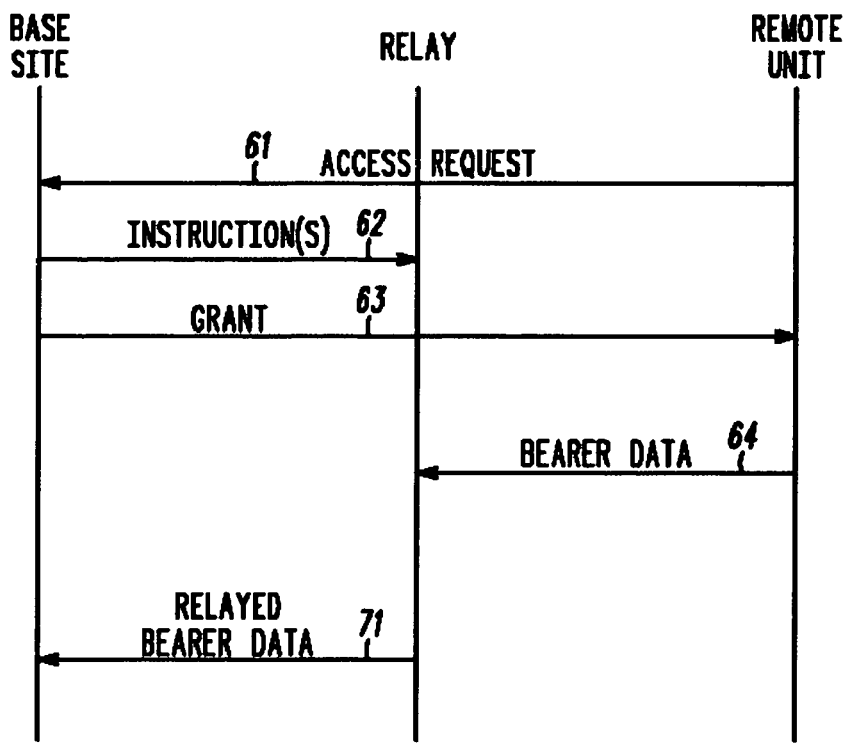
FIG. 7 comprises a timing diagram for a second example as configured in accordance with various embodiments of the invention.

Referring now to FIG. 7, the same sequence of events as was set forth in example 1 above can be repeated until reception of the bearer data transmission 64 by the relay resource. In this example, however, the relay resource does not effect a concurrent relaying of the received transmission. Instead, the relay resource effects a store-and-forward action by retaining the received information and relaying the information at a later time (using, for example, the same or another wireless bearer channel as was used by the remote unit to convey the original transmission).

EXAMPLE 3

Figure 8:
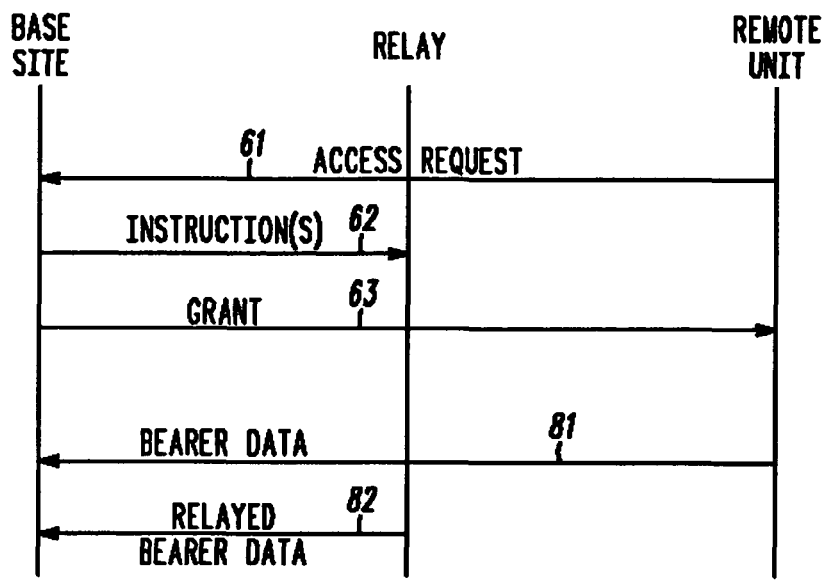
FIG. 8 comprises a timing diagram for a third example as configured in accordance with various embodiments of the invention.

Referring now to FIG. 8, the remote unit can again issue an access request 61, in response to which the base site can properly instruct 62 the relay resource and issue a corresponding grant 63 to the remote unit. In this example, the bearer data transmission 81 from the remote unit is conveyed to and received by the base site. In addition, the bearer data transmission is also received by the relay resource, which then effects a store-and-forward relaying 82 of that transmission to the base site. So configured, the base site has both transmissions to utilize in various ways as described above.

EXAMPLE 4

Figure 9:
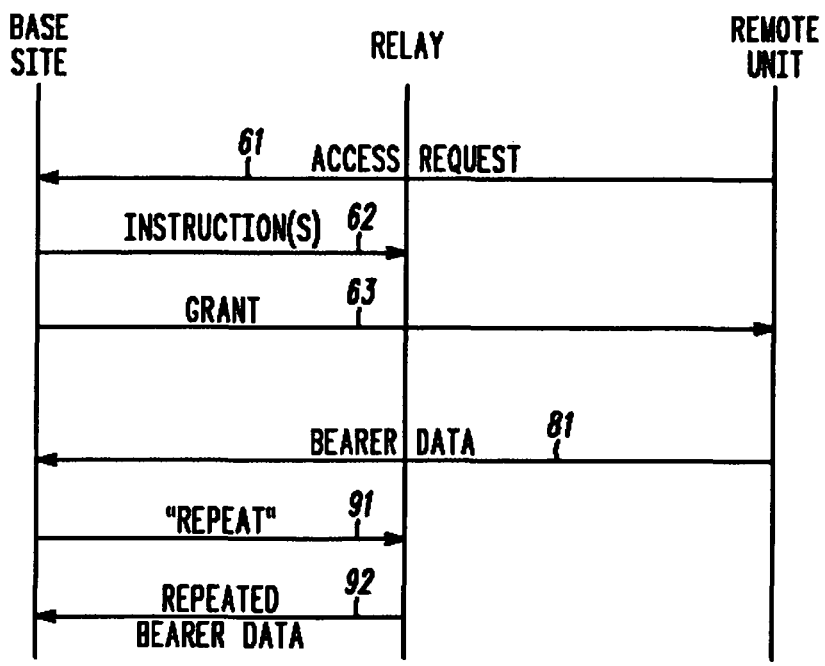
FIG. 9 comprises a timing diagram for a fourth example as configured in accordance with various embodiments of the invention.

Referring now to FIG. 9, the same series of events can transpire as described above with respect to example 3 with the exception that the relay resource does not automatically relay the received bearer data 81. Instead, the relay resource relays the bearer data 92 in response to a specific repeat request 91 as may be issued by the base site as a function, for example, of a given ARQ process.

EXAMPLE 5

Figure 10:
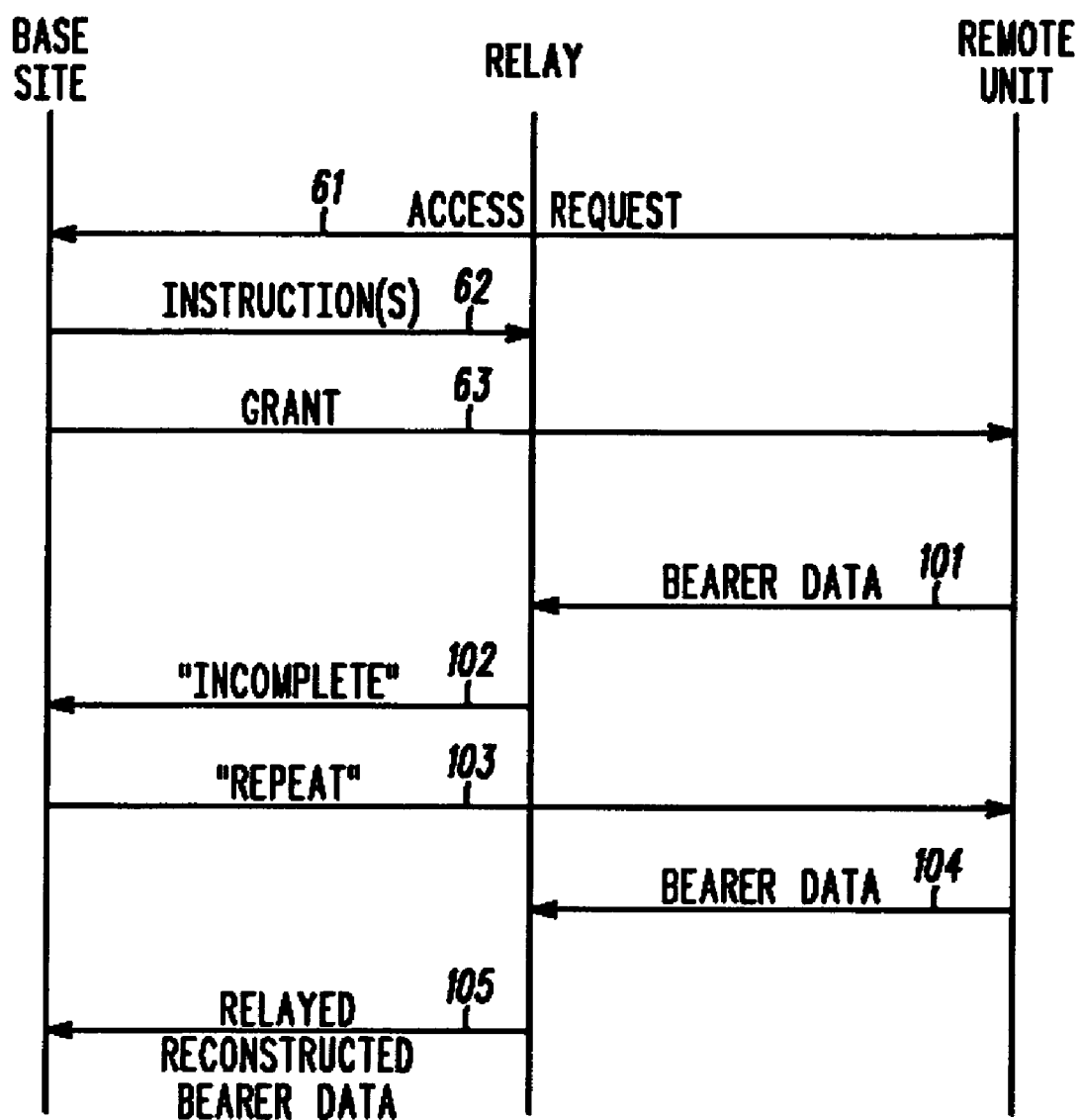
FIG. 10 comprises a timing diagram for a fifth example as configured in accordance with various embodiments of the invention.

Referring now to FIG. 10, following the grant 63, the remote unit transmits bearer data 101. The relay resource receives this bearer data 101 with evident errors. The relay resource transmits 102 to the base site to indicate the incomplete nature of the received transmission (this indication can take any of a variety of forms; for example, the indication can comprise the incomplete transmission itself and/or a signal that specifies the incomplete nature of the received transmission). The base site responds by transmitting a "repeat" instruction 103 to the remote unit (using, for example, an appropriate ARQ protocol). The remote unit responds by repeating all or part of its earlier bearer data transmission 104. In this example this second transmission is either correctly received in its entirety by the relay resource and/or enough of the second transmission is correctly received so as to permit accurate reconstruction of the complete transmission. The relay resource then relays 105 the reconstructed (or fully correctly received) bearer data to the base site. As noted earlier, when using a Hybrid ARQ protocol, the reconstructed bearer data can consist of both originally received and subsequently repeated transmissions that are combined as appropriate to reconstruct a correctly received transmission.

EXAMPLE 6

Figure 11:
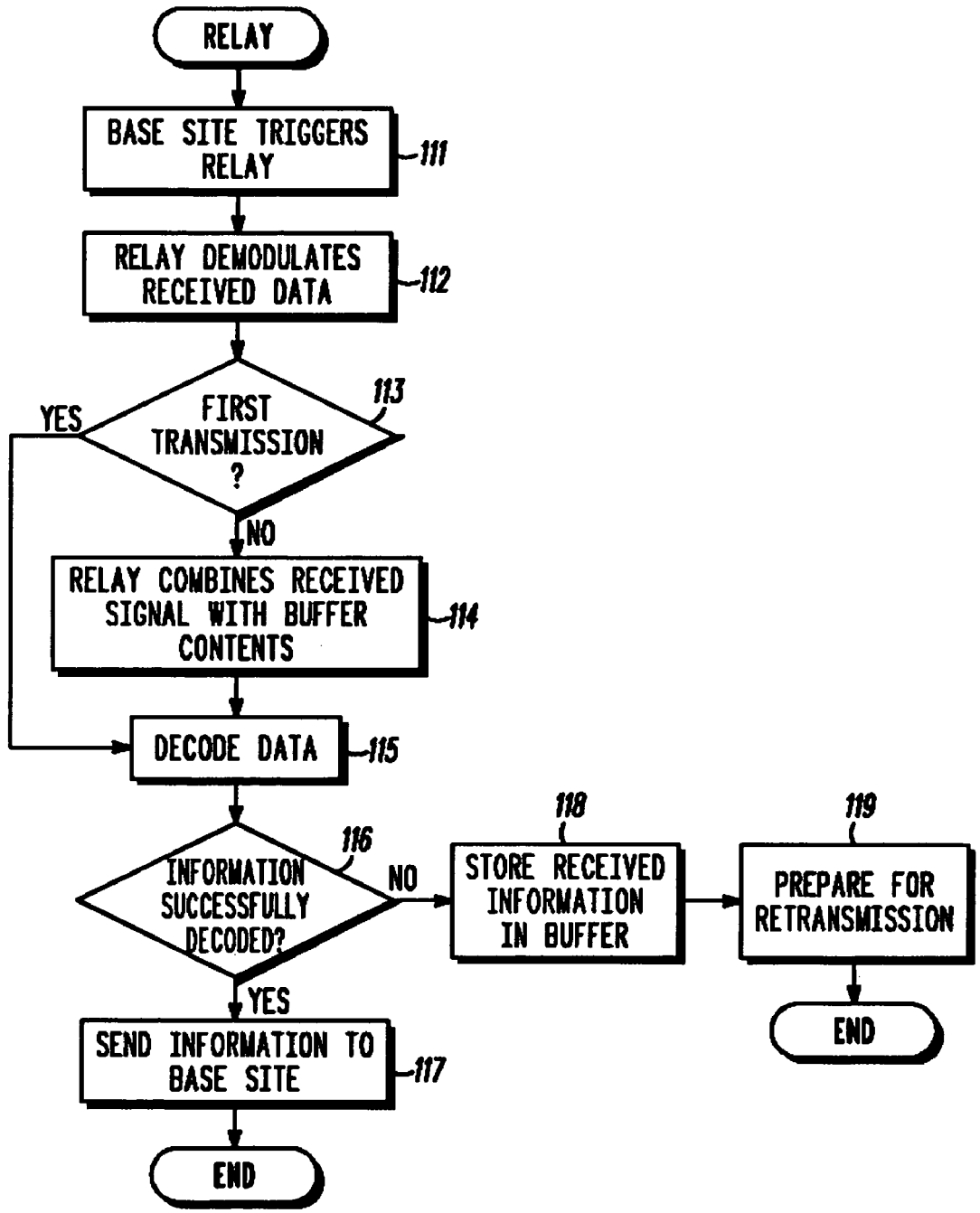
FIG. 11 comprises a flow diagram for a sixth example as configured in accordance with an embodiment of the invention.

Referring now to FIG. 11, and pursuant to this embodiment, a relay can facilitate an HARQ-based process upon being appropriately triggered 111 by a corresponding base site. This may occur at the same time that the base site schedules a transmission from a transmitter. Pursuant to this process, upon receiving a transmission the relay will demodulate 112 the received data. The demodulation process may include the process of equalization and soft information generation such as log likelihood ratios that are used in the HARQ combining and decoding process. In this particular embodiment, the relay then determines 113 whether this transmission comprises a first transmission (that is, that this transmission does not comprise a retransmission of early transmitted information). This determination can be supported in various ways. Pursuant to one embodiment, the base site can inform the relay when scheduling the transmission that the transmission indeed comprises a retransmission.

When the received transmission does constitute a first transmission, the relay decodes 115 the transmission and determines 116 whether the information was successfully decoded and, when true, forwards 117 that information to the base site. When the received transmission does not constitute a first transmission, meaning that the received transmission comprises instead a retransmission of earlier transmitted information, the relay combines 114 the recently received transmission with previously received transmission as was previously stored in a buffer. The relay then, as with a first transmission, decodes 115 the combined transmission and determines 116 whether the information has now been successfully decoded.

When not true, meaning either that an original transmission or a retransmission as combined with any previously buffered transmission has not been successfully decoded, the relay stores 118 the received transmission in a buffer so that this information will be available for use as described above should a retransmission be subsequently received. Pursuant to one embodiment, the base station may not receive any data from the relay, hence determines that the relay has likely not successfully decoded the information. The base station then sends a message to the remote unit to order the remote unit to send the next retransmission. The relay then prepares 119 to receive such a retransmission and, upon receiving such a retransmission, repeats the process set forth above. The HARQ process is thus distributed between the relay and the base station with the relay combining the retransmissions and the base site controlling the retransmissions from the remote unit. Note also that more than one relay can be involved in the HARQ process. The retransmission process is terminated as soon as at least one relay successfully decoded the information sent by the remote unit and sent back this information to the base station.

EXAMPLE 7

As discussed above, situations exist where a relaying device may wish to re-encode and re-modulate data received from a remote unit. For example, a relay may be activated and operating a store and forward mode, such as receiving/detecting a transmission from a remote unit in one frame and transmitting the information from the relay to the base in a following frame. An advantage of this type of operation is that the relay may use a different (and typically more efficient) modulation/coding configuration for its transmission than the remote unit used for its transmission.

Figure 12:
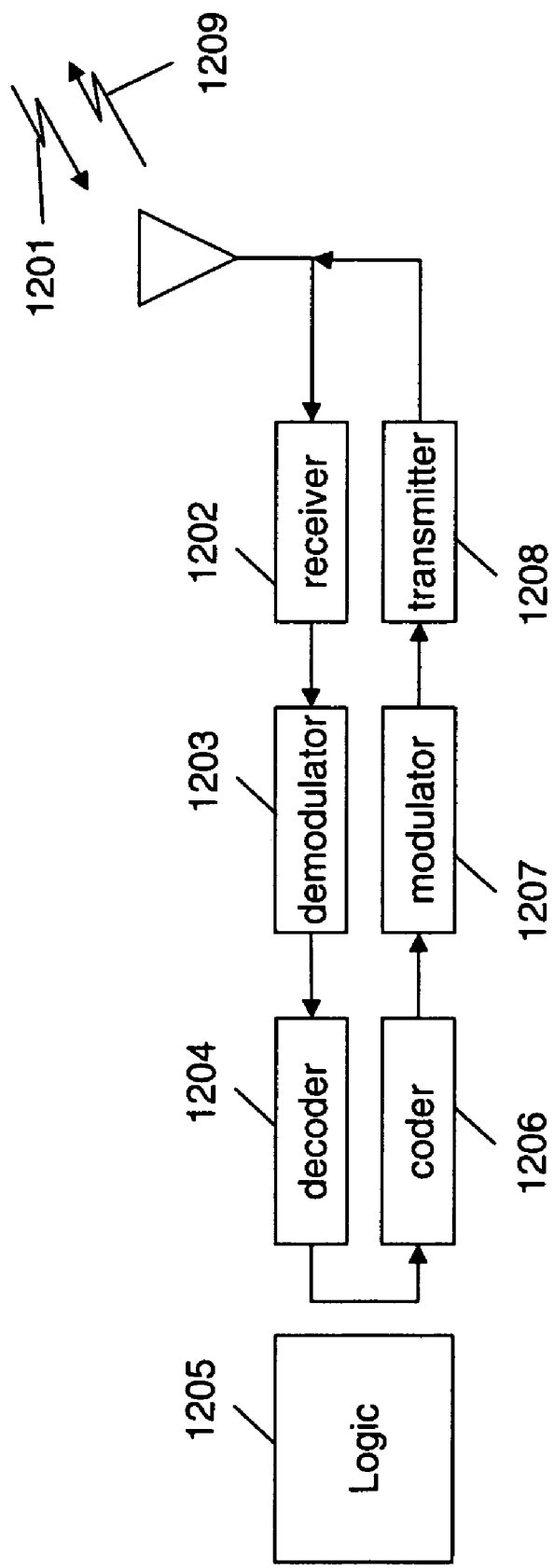
FIG. 12 is a block diagram of a relay device.

In order to be able to re-encode and re-modulate data received for relaying, a relaying node must be equipped to demodulate and decode data received, and then re-encode and re-modulate the data for transmission. Such a relaying node is shown in FIG. 12. As shown, relay device 1200 comprises receiver 1202, demodulator 1203, and decoder 1204. Data to be relayed is received by receiver 1202 and passed to demodulator 1203 where it is demodulated. The data is then decoded by decoder 1204. Logic circuitry 1205 serves to control all elements within relay unit 1200. More particularly, control information is received by receiver 1202 that identifies such things as an identification of the remote unit to relay, the downlink/uplink frequencies (e.g., OFDM subcarriers) and time intervals being used by the remote unit, and the modulation and coding techniques utilized by the remote unit. Additionally, the control information may comprise the modulation and coding scheme and the uplink times/frequencies/subchannels to use by the relaying device when performing relay functions. Once decoded, the data is again re-encoded by coder 1206, re-modulated by modulator 1207 and transmitted via transmitter 1208.

Figure 13:
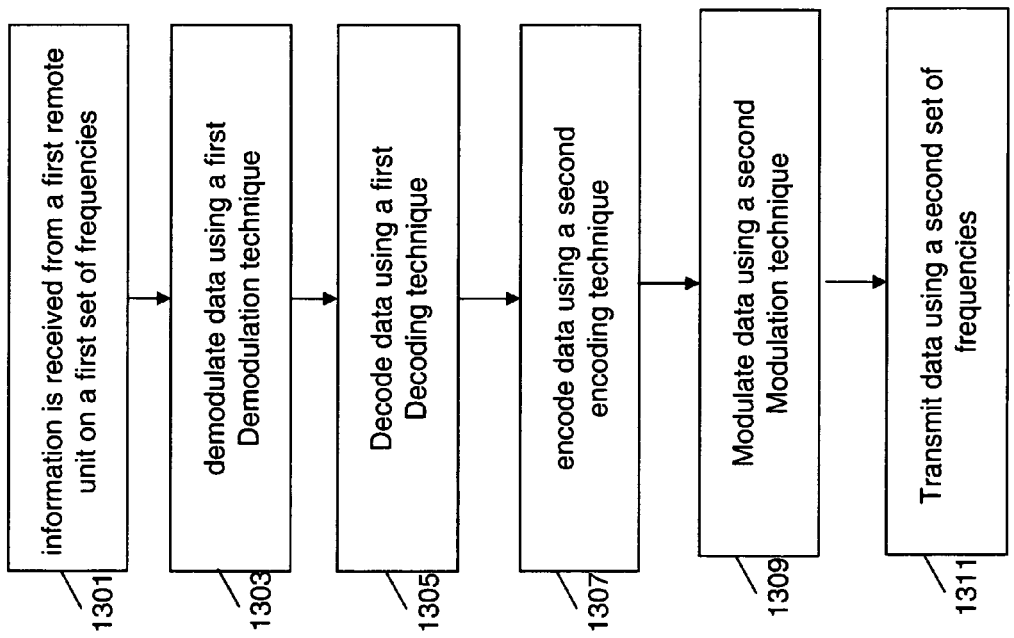
FIG. 13 is a flow chart showing operation of the relay device of FIG. 12.

FIG. 13 is a flow chart showing operation of relay unit 1200. The logic flow begins at step 1301 where information is received from a first remote unit on a first set of frequencies (e.g., a first set of OFDM sub-carriers). As discussed above, the data is received having a first modulation and a first coding scheme. At step 1303 the data is demodulated by demodulator using a first demodulation technique 1203 and then decoded by decoder 1204 using a first decoding technique (step 1305). The data is then relayed to a base station. As discussed, the relayed data may be re-encoded and re-modulated with a second modulation and a second coding scheme.

At step 1307 the data is re-encoded by coder 1206 using a second coding scheme, and then re-modulated by modulator 1207 using a second modulation scheme (step 1309). Finally, the re-modulated and re-encoded data is transmitted by transmitter 1208 at step 1311. As discussed above, the data may be re-transmitted using a second set of frequencies, or OFDM sub-carriers (e.g., a first and a second subcarrier/subchannel, differing from the first set of frequencies, or overlapping, or having at least one differing subcarrier). As part of standard operation, both the first and the second set of frequencies are part of a group of frequencies used for uplink transmission. Thus, other relay devices may simultaneously relay information using the second set of frequencies. However, if the data is re-transmitted in a different time interval than it was received (which is typically the case for this example, in order to allow time for the decoding and re-encoding), then the second set of frequencies may be the same, if desired, as the first set of frequencies.

It should be noted that FIG. 13 illustrated the relaying of one subscriber station, however, in alternate embodiments of the present invention, multiple subscriber stations may be relayed by a single relay device. In such an instance, the multiple transmissions will be received from the multiple subscriber stations and demodulated and decoded. Re-modulation and re-encoding will take place and the transmissions will be relayed as discussed above over a relay-to-base resource. It should be noted that the transmissions will be relayed in a predetermined order so that the base station may determine the locations of each subscriber-station's transmission. In the preferred embodiment of the present invention the predetermined order simply comprises an order in which the transmissions were received from the multiple subscriber stations. Alternatively, the multiple devices may be relayed in a same relative order as their transmissions (or assignments) appeared in a previous frame.

Prior to performing the above steps, the relay needs to be aware of which particular connection(s) from which particular remote or subscriber unit(s) to relay/monitor. The relay assignment process is preferably done on a frame-by-frame basis. Each relay (or a group of relays) receives a monitoring message and is assigned the connection identification number (or similar identification information) of one or more remote units whose transmissions it needs to monitor in the uplink portion of the current frame. In 802.16, the identifier may be a CID (connection Identifier). The relay also decodes a control information where resources and modulation/coding schemes are assigned to the remote units to figure out the resource assignment for each connection. Alternatively, instead of being done on a per-frame basis, the assignment could remain valid until a future assignment or de-assignment is received. Or, the assignment could be valid for a predetermined amount of time.

The relay also needs to be allocated relay-to-base resource (such as a timeslot, set of frequencies, subcarriers, or subchannel) for its transmission, of the relayed connections to the base station along with a particular modulation/coding scheme. The assignment of the resources for the transmission for the relay to the base station is preferably done on a frame-by-frame basis. Each relay (or group of relays) is assigned resources via a assignment message. This resource assignment message is preferably broadcasted using the same control channel message as for the remote units (for instance, using the UL_MAP_IE message in the IEEE 802.16 standard). Alternatively, this message can be broadcasted to the relays only, or could even be a dedicated message to a relay (or a group of relays).

In one embodiment, the assignment message provides a block resource assignment for multiple remote units. The relay resource(s) use a predetermined data ordering rule to ensure that transmissions from all relay resources send the same data portions on exactly the same corresponding resources. The relay (or group of relays) receives a single resource assignment message for all the connections it needs to monitor. The resource assignment message preferably comprises of a block of frequency resources (for instance, an allocation of subcarriers in an orthogonal frequency division multiplexing system) and of a modulation/coding scheme. Alternatively, the modulation/coding scheme for the relay to base station transmission might already be known by the relay, so that the resource assignment message comprises of a block of frequency resources only. The relay figures out which resources to assign to each relayed connection with the two following rules. First, the messages to be relayed are transmitted from the relay to the base station in the same relative order as they were received on the control information message where resources and modulation/coding schemes are assigned to the remote units. Second, the transmissions to be relayed are encoded separately as if the base station had sent separate allocations for each connection to be relayed: with this second rule, the relay is able to figure out the amount of channel resources (e.g., subchannels, subcarriers, frequencies or time slots) to assign for each relayed connection.

It may happen that a relay is not able to successfully demodulate and decode a remote unit transmission that needs to be relayed. For instance, the relay can assess whether or not a transmission was successfully decoded by checking a CRC appended to the data portion of the transmission. In this case, the relay does not transmit anything on the resources assigned for the relaying on this particular connection.

Figure 14:
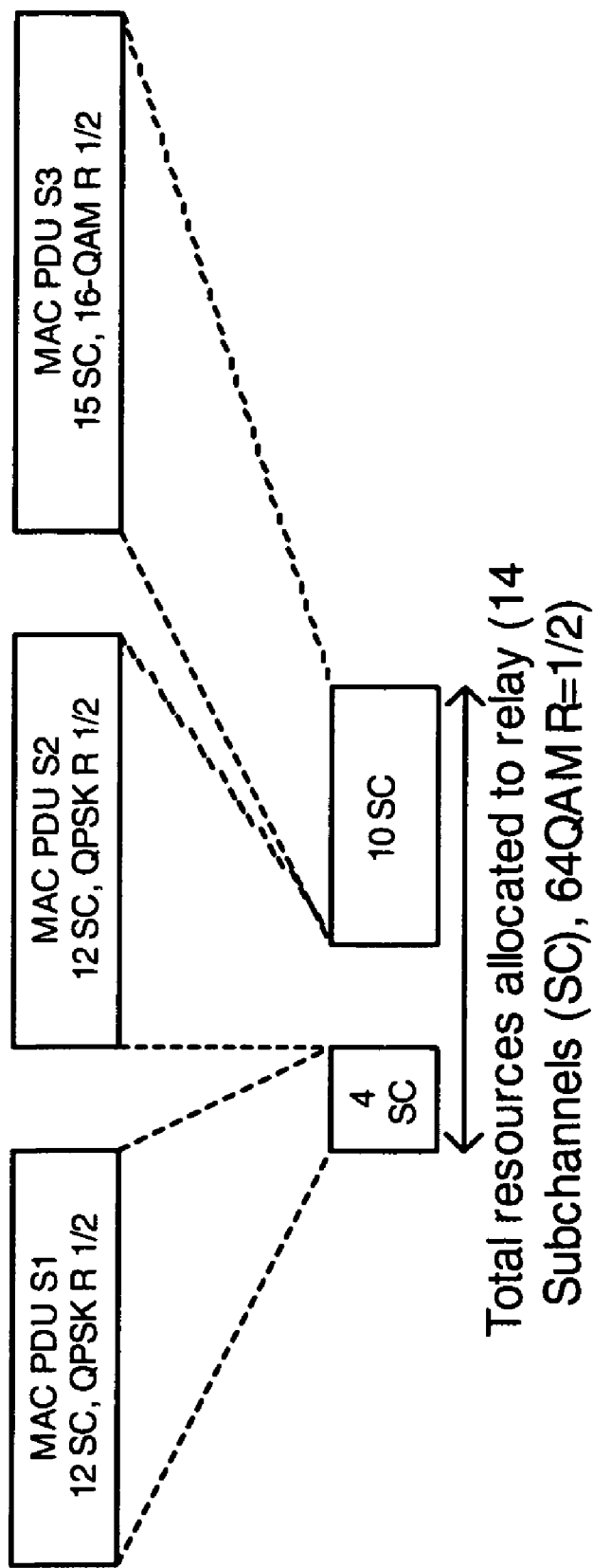
FIG. 14 is an example of a relay resource allocation.

An example of relay resource allocation is given in FIG. 14. In the example described, the relay as to relay three transmissions labeled MAC PDU S1, MAC PDU S2 and MAC PDU S3. The relay receives its resource allocation in a previous message for relaying the three transmissions with 64-QAM modulation and a channel coding with rate %, and the subchannel allocation to perform the relaying operation, a subchannel being a group of subcarriers. The first transmission to be relayed, MAC PDU S1 is decoded, demodulated and encoded with 64-QAM rate ½. Since the initial modulation and coding scheme was QPSK modulation with channel coding rate ½, the modulation and coding scheme used by the relay (64-QAM rate ½) requires 3 times less resources than the modulation and coding scheme used by the remote unit (QPSK rate ½). As a consequence, since the amount of resources allocated to the remote unit was 12 subchannels for MAC PDU S1 transmission with QPSK ½, the relay only allocates 12/3=4 subchannels for its MAC PDU S1 transmission. Similarly, the relay allocates the next 4 subchannels for MAC PDU S2. However, the relay was not able to receive correctly MAC PDU S2, therefore does not transmit anything for that particular connection, but leaves blank the portion of the assigned resources where it should have relayed MAC PDU S2. Resources for relaying MAC PDU S3 are assigned after the resources that were provisioned for MAC PDU S2. This relay resource assignment process enables the base to know where to find the relayed data for each connection even though the relay uses a different modulation/coding scheme than the remote units. Macro-diversity is also provided when multiple relays are assigned to relay the same connection. Note that the PDUs S1, S2, and S3 may be three transmissions from three different remote units, or they may be different PDUs that need to be relayed from a single remote unit, or some combination.

EXAMPLE 8

Some aspects of the invention will be further described for application to example broadband wireless system, such as an IEEE 802.16e system. For such a system, a relay resource can initially and/or periodically perform network entry and initialization in a similar manner as a conventional subscriber station (SS), except that at one point (the registration process), the unit must identify itself as a relay resource. As an example in an 802.16 system where a remote unit is termed a subscriber station (SS), Transparent Relay Capability may be indicated in a field that indicates whether the unit is a regular SS or a transparent relay. For example, with a value of 1 if the unit is a relay resource or a 0 if the unit is an SS (default). A conventional remote unit in 802.16, as part of the initialization/re-initialization process, will synchronize to the BS in terms of frequency reference, which can be done by monitoring the BS downlink transmission of preambles, pilot symbols, or the like, and uplink timing advance to compensate for propagation delay differences. Uplink timing advance adjusts the reference time used for determining when to begin transmission to the BS. A macro-diversity benefit may be obtained by making transmissions from each of the selected relay resources on the same channel resource, where the relay resources are preferably synchronized to the base station timing and frequency so that the transmissions from the selected relay resources arrive at the base station approximately synchronously. This allows the base station to receive the transmissions of multiple relay devices, all relaying a single SS's transmission, with over-the-air combining providing a macrodiversity gain.

Each transmission has the same modulation and coding scheme, and is transmitted on the same channel resource.

Figure 15:
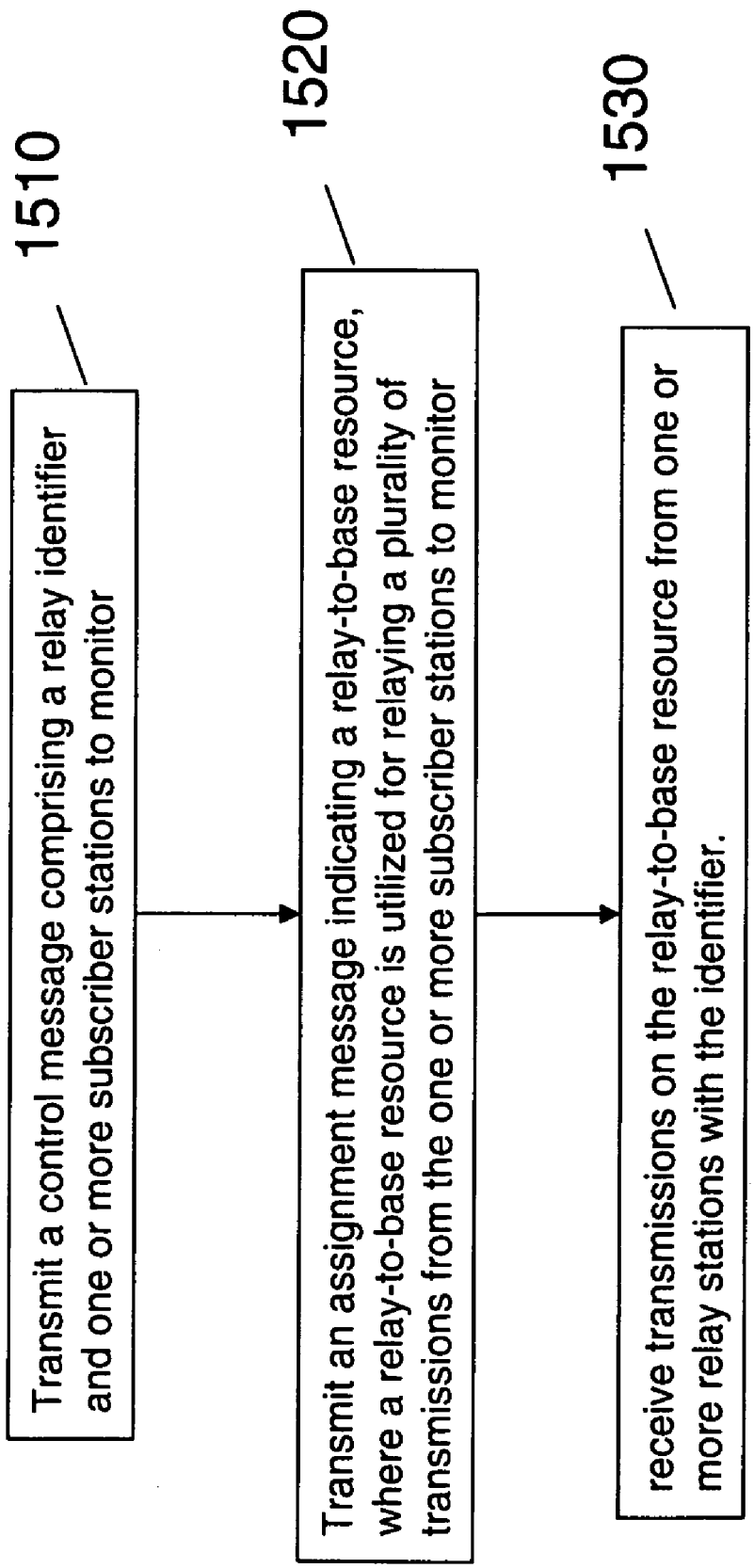
FIG. 15 is a flow chart showing operation of the base station of XDSTSH.

FIG. 15 is a flow chart showing operation of a base station receiving relayed transmissions from a subscriber station. The logic flow begins at step 1510 where the base station transmits a control message comprising a relay identifier and one or more subscriber stations to monitor. The relay identifier may be assigned to more than one relay. At step 1520 the base station transmits an assignment message indicating a relay-to-base resource, where a relay-to-base resource is utilized for relaying a plurality of transmissions from the one or more subscriber stations to monitor. The assignment message in step 1520 may indicate a modulation and coding rate to utilize when relaying communications. At step 1530 the base station receives transmissions on the relay-to-base resource from one or more relay stations with the identifier.

For determining which SS uplink transmissions a relay must monitor, a relay assignment process may be performed as often as a frame-by-frame basis. Each relay (or group of relays) is assigned the CIDs whose transmissions it needs to monitor in the uplink portion of the current frame or some other frame. Therefore, by decoding the UL_MAP, each relay knows every resource it needs to listen to and attempt to detect. Note that a relay may monitor one or more connections (e.g., one or more SSs) and may be part of one or more multicast groups. For example, a relay may be assigned to monitor two different connections and may be addressed by different CIDs (e.g., a special CID if the relay being activated, or even a multicast CID if it is part of a group of relays being activated).

Alternatively, instead of being done on a per-frame basis, the assignment could remain valid until a future assignment or a de-assignment is received. Or, the assignment could be valid for a pre-determined amount of time (e.g., 10 frames).

The assignment of resources for the transmission from the relay(s) to the BS may also be done on a frame-by-frame basis. Each relay (or group of relays) is assigned resources via the existing UL-MAP_IE message. Each relay only relays connections for which it has successfully decoded the data.

Since the relays only relay back connections for which it has successfully decoded the data from the SS, the BS can initially start assigning a high MCS to the SS. The relay then monitors the link. If it cannot successfully decode the data from the SS, it does not send anything to the BS. The BS, not receiving anything, knows that the chosen MCS is too high, then assigns a lower MCS to the SS until it receives something from one or more relays. The process would allow an initial MCS selection. After this initial MCS selection, the HARQ process can fine-tune the MCS selection.

Alternatively, a blind AMC selection could be made by the BS based on some open-loop approximation. The simplest method of MCS selection would be to use an aggressive default value with the hope that the SS is close to either one of several relays or the BS. The system may rely on Hybrid ARQ and retransmission to mitigate all poorly chosen AMC levels.

Alternatively, the relay may eavesdrop on the ranging channel, then report information to the base. The relay could use the ranging channel to report this information. Or, dedicated resources (Say 1 RE) could be reserved by the BS for this process. To avoid collision between all the relays, each relay is assigned a Walsh code and spreads the report with the assigned code.

When there is only one relay, the relay can piggyback the MCS information with the relayed data. When multiple relays and RF combining, this solution is not applicable. The relays could send an MCS increase request on the ranging channel. Alternatively, the CDMA embodiment mentioned above is applicable as well. Also, it might be possible to use some type of analog feedback (e.g., by modifying the transmit power) to notify the base that a higher MCS could be supported.

The relays can also transmit beacons at given times, the SS can measure received power, and makes its own MCS request.

The invention as described for application to a system such as IEEE 802.16e can also support HARQ on the uplink. The relay (or group of relays) buffer the data received from the SS. When a relay successfully decodes the packet, it sends the data to the BS on the resources explicitly assigned on the uplink. If the decoding is not successful, the relay (or group of relays) does not transmit anything. Not receiving anything, the BS knows that the transmission was not successful, and sends the control for the next HARQ transmission.

So configured it can be seen that a wide variety of embodiments and configurations are possible that all serve to facilitate the provision of a given level of increased quality of service to a transmitter that is already within reception range of a receiving station. These embodiments range from relatively simplistic configurations and actions to considerably more complicated scenarios; as such, it will be appreciated that these basic teachings are readily scalable to suit the needs and requirements of a wide variety of system challenges.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, the quality of service relays described above could be used in conjunction with range extension repeaters as may be desired and/or appropriate to a given application.

We claim:

1. A method for a relay device to relay information within a communication system, the method comprising the steps of: receiving a message indicating subscriber stations to monitor; receiving an assignment message indicating a relay-to-base resource, wherein the assignment message indicates a modulation and coding rate to utilize when relaying communications; receiving transmissions from the subscriber stations; demodulating and decoding the subscriber stations' transmissions; re-modulating and re-encoding the subscriber stations' transmissions; and relaying the re-modulated and re-encoded transmissions over the relay-to-base resource, wherein the transmissions are relayed in a predetermined order.

2. The method of claim 1 wherein the step of relaying the transmissions in the predetermined order comprises the step of relaying the transmissions in the order they where received.

3. The method of claim 1 wherein the step of relaying the transmissions in the predetermined order comprises the step of relaying the transmissions in a same relative order as the assignments appeared in a previous frame.

4. The method of claim 1 wherein the step of relaying the transmissions comprises the step of relaying only transmissions that were demodulated and decoded correctly by leaving a portion of the assigned relay-to-base resource, associated with a transmission that was not decoded correctly, empty.

5. The method of claim 1 wherein the step of relaying the re-modulated and re-encoded transmissions over the relay-to-base resource comprises the step of relaying the re-modulated and re-encoded transmissions over a relay-to-base resource utilized substantially simultaneously by another relay device.

6. The method of claim 1 further comprising determining a modulation and coding rate, to utilize when re-modulating and re-encoding the one or more subscriber stations' transmissions.

7. The method of claim 1 further comprising the step of sending a message indicating relaying capability prior to relaying transmissions from the one or more subscriber stations.

8. A method for a base station to receive relayed transmissions from a subscriber station, the method comprising the steps of: transmitting a control message comprising a relay identifier and one or more subscriber stations to monitor; transmitting an assignment message indicating a relay-to-base resource, wherein the relay-to-base resource is for relaying a plurality of transmissions from the one or more subscriber stations to monitor and wherein the assignment message indicates a modulation and coding rate to utilize when relaying communications; and receiving transmissions on the relay-to-base resource from a relay station with the identifier.

9. The method of claim 8 further comprising receiving transmissions on the relay-to-base resource from another relay station with the identifier.

10. The method of claim 8 further comprising assigning the relay identifier to more than one relay.

* * * * *